G. E. WILLMARTH.
APPARATUS FOR ACCURATELY READING MILK TEST BOTTLES.
APPLICATION FILED JAN. 14, 1919.

1,315,446.

Patented Sept. 9, 1919.

Inventor
George Elliot Willmarth
By Sturtevant & Mason
Attorneys

UNITED STATES PATENT OFFICE.

GEORGE ELLIOT WILLMARTH, OF POTSDAM, NEW YORK.

APPARATUS FOR ACCURATELY READING MILK TEST-BOTTLES.

1,315,446.   Specification of Letters Patent.   Patented Sept. 9, 1919.

Application filed January 14, 1919. Serial No. 271,007.

*To all whom it may concern:*

Be it known that I, GEORGE ELLIOT WILLMARTH, a citizen of the United States, residing at Potsdam, in the county of Saint Lawrence, State of New York, have invented certain new and useful Improvements in Apparatus for Accurately Reading Milk Test-Bottles, of which the following is a description, reference being had to the accompanying drawing and to the figures of reference marked thereon.

My invention relates to new and useful improvements in an apparatus for accurately reading a test bottle to determine the percentage of fat in milk and cream.

The object of my invention is to provide an apparatus adapted to support a test bottle containing milk or cream and having means whereby two cross wires are adjusted to indicate the upper and lower ends of the fat column, and also means for magnifying the same so that a closer reading of the scale on the test bottle may be made. I also provide means for the adjustment of the test bottle so that the lower cross wire may be brought into a predetermined position and the upper cross wire give accurately the percentage of fat in the neck of the test bottle, by the scale marked thereon.

Another object of my invention is to provide a simple, cheap and effective apparatus of this character having certain details of structure and combination of parts hereinafter more fully described.

In the accompanying drawing—

Figures 1, 2, 3, 4:
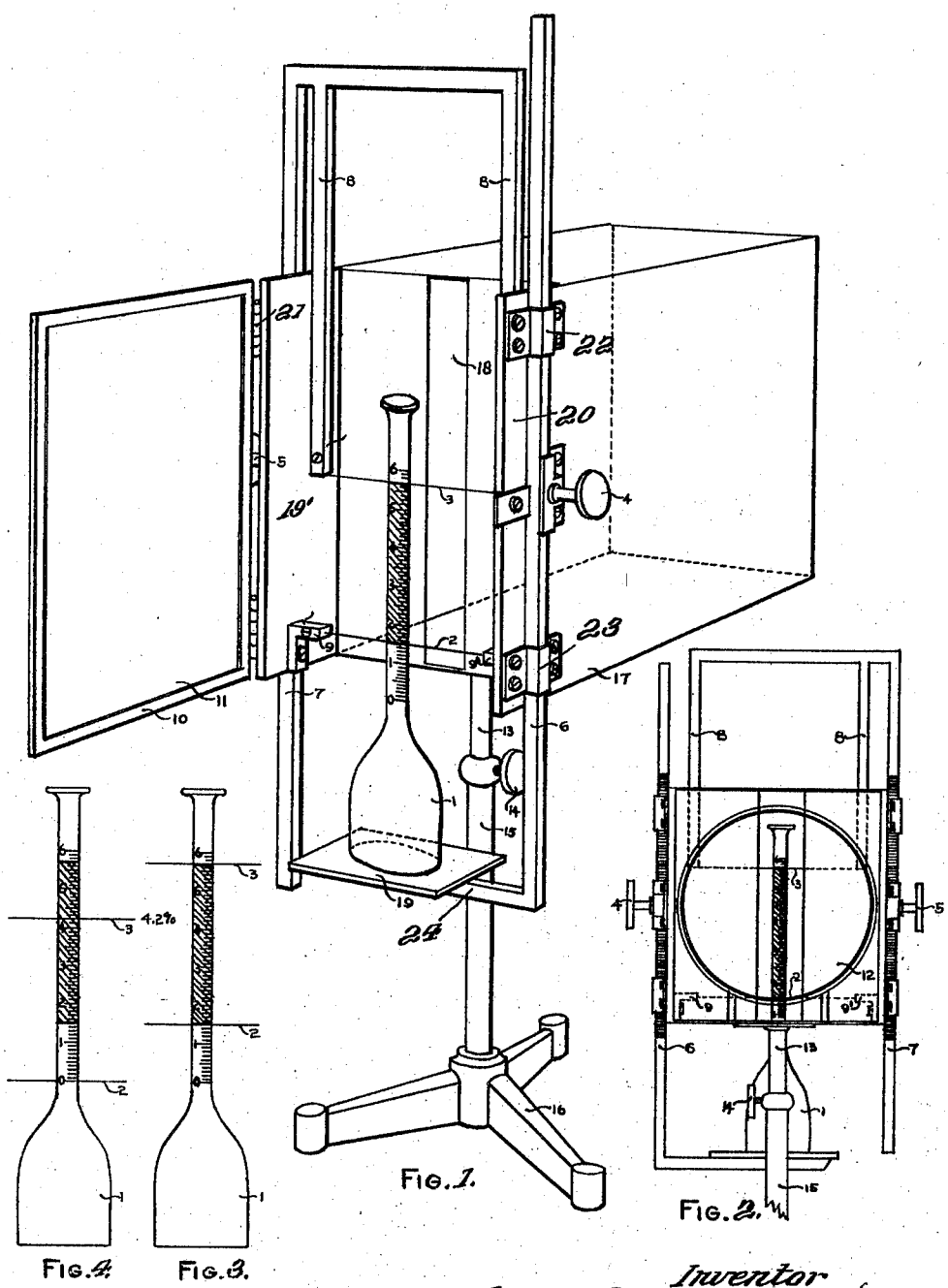
Figure 1 is a perspective view of the rear end of my improved apparatus, showing a test bottle supported thereby.
Fig. 2 is an enlarged front view, showing the operating means for the shelf and vertically movable horizontal cross wire.
Fig. 3 is a side elevation of the test bottle, showing the horizontal wires indicating the upper and lower ends of the fat column.
Fig. 4 shows the test bottle moved upwardly to bring the lower horizontal wire opposite zero on the test bottle, so that the upper cross wire will indicate the percentage of fat in the milk on the scale indicated on the test bottle.

Referring now to the drawings, 16 represents a base of any desired form, having a standard 15 extending upwardly and which is of a hollow form having a rod 13 telescoping therein and held in its adjusted position by means of a set-screw 14. The upper end of the rod 13 supports a housing or camera body 17, which is free to swing in a horizontal plane, enabling the operator to make any reading of the test bottle without changing his position, all of which will be hereinafter more fully described.

The front end of the camera is provided with a lens 12, while the rear end is provided with a vertical slot 18, which extends the entire height of the camera, as clearly shown in Fig. 1 of the drawings. The sides of the camera are provided with extensions 19' and 20 which extend beyond the rear end of the camera, and the extension 19' has a frame 10 hinged thereto, at 21, which carries a ground glass 11, and together with the lens magnifies the test bottle and cross wire, as will be later more fully described. The frame 10 closes against the extension 20, leaving a space between the same and the end of the camera to allow the test bottle to be in a position between the lens and the ground glass, as is readily understood.

The side of the camera 17 is provided with two guide ways 22 and 23, in which is vertically movable a rack bar 6, with which meshes a pinion carried by the hand wheel 4, whereby the rack bar is vertically adjustable. The lower end of the rack bar carries a horizontal portion 24, which supports a shelf 19, adapted to support the test bottle 1, as clearly shown in Fig. 1 of the drawings, and whereby the test bottle is vertically adjusted for the purpose later described. Carried by the inner faces of the side extensions 19' and 20 are two brackets 9 and 9' to which are connected the stationary horizontal cross wires 2.

Slidably mounted between the extensions 19' and 20 is a frame 8 which has at its upper end a downwardly extending rack bar 7, on the outside of the extension 19' and with which meshes a pinion carried by the hand wheel 5, whereby the frame 8 is moved vertically. The lower end of the frame 8 is connected by a wire 3 and moves up and down with the frame.

The operation of the device is as follows: The test bottle is placed on the shelf 19, which brings its neck into contact with the two wires 2 and 3, and opposite the slot 18 in the camera 17. The frame 10 is then closed and observation is made through the lens 12 from the front of the camera. The hand wheel 4 is then rotated and through the medium of the pinion carried thereby moves the rack bar 6 up or down, so as to adjust the shelf to move the test bottle so that the lower end of the fat column therein is directly opposite the wire 2. The hand wheel 5 is next turned and through the pinion and rack 7, the frame 8 is adjusted to bring the wire 3 directly opposite the upper end of the fat column in the test bottle. Through the medium of the lens 12 and ground glass 11, the parts are magnified and the adjustment of the wires can be more accurately made to bring them opposite the upper and lower ends of the fat column. This operation having been completed, the hand wheel 4 is again operated to raise the rack bar and the shelf carried thereby, to raise the test bottle, so that the lower wire 2 will come directly opposite the zero mark on the test bottle and the upper wire will indicate the percentage of fat. In the illustration shown in Figs. 3 and 4, the percentage of fat will be 4.2%.

While I have shown this specific arrangement of parts for adjusting the test bottle and the cross wire, as well as the specific arrangement of the ground glass and lens, it will be understood that the same may be varied without departing from my invention.

Having thus described my invention, what I claim as new and desire to secure by Letters Patent, is:

1. An apparatus of the character described comprising a support, a housing carried thereby and having a lens and a ground glass, a shelf supported thereby adjacent the lens and adapted to support a test bottle between the lens and ground glass, means for vertically adjusting said shelf, a horizontal wire permanently attached to the support, a second horizontal wire, and means for vertically adjusting said second wire.

2. An apparatus of the character described comprising a camera having a slot extending vertically from top to bottom, a support for the test bottle opposite the slot, means for adjusting said support, a stationary horizontal wire extending across said slot, a horizontal wire extending across said slot, and means for vertically adjusting said wire.

3. An apparatus of the character described comprising a camera having a slot extending vertically from top to bottom, a ground glass beyond said slot, a support for the test bottle and adapted to support the same between the slot and ground glass, means for vertically adjusting said support, a horizontal stationary wire extending across said slot, a second horizontal wire extending across said slot, and means for vertically adjusting the last mentioned wire.

4. An apparatus of the character described comprising a camera having a slot extending vertically from top to bottom, a ground glass beyond the slot having a space between the same, a support for the test bottle below the camera and adapted to support the bottle between the slot and ground glass, a rack and pinion for vertically adjusting said support, a horizontal stationary wire extending across said slot, a vertically movable horizontal wire extending across said slot, and a rack and pinion for vertically adjusting said wire.

5. An apparatus of the character described comprising a camera body adapted to freely swing horizontally and having a slot extending vertically from the top to the bottom, a ground glass spaced from said slot, a test bottle support below said space, a rack and pinion for vertically adjusting said support, a horizontal stationary wire extending across the slot, a vertically movable horizontal wire extending across said slot, and a rack and pinion for vertically adjusting said wire.

6. An apparatus of the character described comprising a camera adapted to freely swing horizontally and having a slot extending vertically from the top to the bottom, a ground glass hinged to the camera and spaced from the slot, a rack and pinion carried by the side of the camera, a laterally extending arm carried by the lower end of the rack, a shelf carried by the arm below the space between the slot and ground glass and adapted to support a test bottle, a stationary wire extending across the slot, a rack and pinion carried by the side of the camera, a frame carried by the upper end of the rack and extending downwardly within the space between the slot and ground glass, and a horizontal wire carried by the lower end of said frame and extending across the slot.

In testimony whereof, I affix my signature in the presence of two witnesses.

GEORGE ELLIOT WILLMARTH.

Witnesses:
HARVEY D. THATCHER,
JESSIE M. JOHNSON.

Copies of this patent may be obtained for five cents each, by addressing the "Commissioner of Patents, Washington, D. C."